(12) United States Patent
Abgrall et al.

(10) Patent No.: US 8,626,229 B2
(45) Date of Patent: Jan. 7, 2014

(54) QUALITY OF SERVICE-CONSTRAINT CENTRALISED POWER ALLOCATION METHOD

(75) Inventors: Cédric Abgrall, Grenoble (FR); Emilio Calvanese Strinati, Grenoble (FR)

(73) Assignee: Commissariat à l'énergie atomique et aux énergies alternatives, Paris (FR)

(*) Notice: Subject to any disclaimer, the term of this patent is extended or adjusted under 35 U.S.C. 154(b) by 345 days.

(21) Appl. No.: 13/178,769

(22) Filed: Jul. 8, 2011

(65) Prior Publication Data

US 2012/0083300 A1 Apr. 5, 2012

(30) Foreign Application Priority Data

Jul. 26, 2010 (FR) ...................................... 10 56114

(51) Int. Cl.
*H04B 1/04* (2006.01)
*H04B 7/185* (2006.01)
*H04W 4/00* (2009.01)

(52) U.S. Cl.
USPC ......... 455/522; 455/127.1; 370/318; 370/328

(58) Field of Classification Search
USPC ................... 455/509, 522, 422; 370/338, 329
See application file for complete search history.

(56) References Cited

U.S. PATENT DOCUMENTS

| 7,593,426 B1 | 9/2009 | Lee et al. |
| 2007/0060167 A1 | 3/2007 | Damnjanovic et al. |
| 2007/0274404 A1 | 11/2007 | Papandriopoulos et al. |
| 2007/0280183 A1* | 12/2007 | Cho et al. ...................... 370/338 |
| 2008/0070585 A1* | 3/2008 | Wu et al. ..................... 455/452.2 |
| 2011/0256901 A1* | 10/2011 | Guey ............................. 455/522 |

OTHER PUBLICATIONS

European Search Report issued Aug. 26, 2011 in Patent Application No. EP 11 17 3779.
Chung Sue Chen et al., "Optimal Power Allocation for Two-Cell Sum Rate Maximization Under Minimum Rate Constraints", Wireless Communications Systems. 2008. ISWCS '08. IEEE International Symposium On, XP-031380366, Oct. 21, 2008, pp. 396-400.
Cedric Abgrall et al., "Inter-Cell Interference Mitigation Allocation for Half-Duplex Relays Based Cooperation", Wireless Days (WD), 2009 $2^{nd}$ IFIP, IEEE, XP-031659488, Dec. 15, 2009, pp. 1-6.
Chi-Hsiao Yin et al., "Centralized Power Allocation Algorithms for OFDM Cellular Networks", IEEE Milcom 2003, pp. 1250-1255.
Shin-Chun Chang et al., "Coding for T-User Multiple-Access Channels", IEEE Transactions on Information Theory, vol. IT-25, No. 6, Nov. 1979, pp. 684-691.
U.S. Appl. No. 13/177,709, filed Jul. 7, 2011, Abgrall, et al.

* cited by examiner

*Primary Examiner* — Nizar Sivji
(74) *Attorney, Agent, or Firm* — Oblon, Spivak, McClelland, Maier & Neustadt, L.L.P.

(57) ABSTRACT

The present invention relates to a centralized power allocation method in a wireless telecommunication system comprising at least a first couple of terminals, consisting of a first transmitting terminal and a first receiving terminal, and a second couple of terminals, consisting of a second transmitting terminal and a second receiving terminal. A control node partitions the interference diagram between the communication of the first couple and the communication of the second couple, into different areas, each area being associated to a type of processing of the interference. The control node calculates the minimum power curve for each communication in each said area. The power values to be allocated are given by the coordinates of the point of intersection of both curves in said diagram.

16 Claims, 9 Drawing Sheets

QUALITY OF SERVICE-CONSTRAINT CENTRALISED POWER ALLOCATION METHOD

TECHNICAL FIELD

The present invention generally relates to the field of wireless telecommunication systems and more particularly a power allocation method in such a system.

STATE OF PRIOR ART

One of the problems affecting a communication within a cellular telecommunication system is that of interference generated by other communications of the cell or neighbouring cells. Conventionally, the inter-cell interference due to communications of neighbouring cells is distinguished from the intra-cell interference due to communications of the same cell where the terminal is located.

A large number of techniques have been provided and implemented in order to reduce inter-cell interference. Most of these techniques rely on an orthogonal transmission resource allocation, for example of transmission time intervals (TDMA), of transmission frequencies (FDMA), of sub-carrier intervals of a multiplex OFDM (OFDMA), of transmission codes (CDMA), of transmission beams (SDMA), or even a combination of such resources, so as to separate the different communications of a same cell.

Since the transmission resources are rare, these are generally reused, at least partially, from cell to cell. A radio resource management (RRM) is then in charge of statically or dynamically allocating transmission resources to different cells. It is in particular known to statically reuse transmission frequencies according to a bidimensional scheme (Frequency Reuse Pattern).

Due to the reuse of transmission resources, a first communication between a first terminal and a first base station of a cell can be interfered by a second communication, using the same transmission resource, between a second terminal and a second base station of a neighbouring cell. This situation is even more critical when cells are adjacent and terminals are at the cell border. In this case, terminals need to transmit at full power and then the interference level is high.

For a given communication, herein called first communication, the interference caused by a second communication using the same transmission resource as the first one is commonly called intra-band interference. In contrast with this, the interference caused by a second communication using a different transmission resource (for example a neighbouring transmission frequency or another transmission interval) from that used by the first one is called inter-band interference.

FIG. 1 represents a very simplified cellular telecommunication system, comprising two cells 151 and 152. The first cell 151 contains a first couple of terminals consisting of a first transmitting terminal 110 and a first receiving terminal 120. Similarly, the second cell 152 comprises a second couple of terminals consisting of a second transmitting terminal 130 and a second receiving terminal 140. By terminal, it is herein meant a mobile terminal or a base station, or even a relay terminal in the case of a relayed channel. In particular, it will be understood that both uplink and downlink communications are herein considered. It is further assumed that the first communication between terminals 110 and 120 uses the same transmission resource(s) as the second transmission between terminals 130 and 140 so that both communications mutually interfere.

Processing and reducing the inter-cell interference have been extensively investigated.

The simplest processing method is to consider the interference as a mere thermal noise. However, this processing method is only acceptable if the interference level is low. It is to be noted that most of the power allocation algorithms are based on this hypothesis.

Other processing methods enable to reduce the interference by estimating the information signal of the interfering communication(s). This assumes that the considered receiving terminal is able to decode these information signals and consequently know the codes used to code them. Among these methods, it is in particular known the parallel or PIC (Parallel Interference Canceller) or serial (Successive Interference Canceller) type interference reduction schemes, well known to those skilled in the art.

Another conventional approach for reducing the interference level is to implement an adaptive power allocation method (adaptive power control). Such a method enables to control power levels of different transmitting terminals so as to ensure a predetermined quality of service to different users. This quality of service can be measured according to cases in terms of flow rate, latency time, packet error rate, spatial covering, etc. Conventionally, the parameter(s) used to measure it is called quality of service metric. As a rule, a communication of one user requires a minimum quality of service which is taken into account or negotiated during the admission procedure of the user in the cell. This minimum quality of service is expressed as a constraint on the quality of service metric: latency lower to a threshold, flow rate higher than a minimum guarantee, etc. The power allocation is then performed so as to respect the constraint on the quality of service metric.

Finally, the power allocation can be centrally taken in charge (Centralized Power Allocation) by a specific node of the network, NC (Network Controller), or in a distributed manner (Distributed Power Allocation) within each terminal.

A centralised power allocation method is known from the article of C-H Yih et al. entitled "Centralized power allocation algorithms for OFDM cellular networks" published in IEEE MILCOM 2003, pages 1250-1255.

Power allocation methods, whether centralised or not, generally take as a hypothesis that interference is comparable to thermal noise. However, such a hypothesis is well often pessimistic so that the allocated transmission powers may be substantially higher than those that would be necessary to obtain the desired quality of service. Consequently, this allocation results in a useless energy consumption and, for uplink communications, in reducing terminal autonomy.

A first object of the invention is thus to provide a centralised power allocation method which enables to reduce transmission powers of terminals for a given quality of service constraint.

A second object of the invention is to provide a centralised power allocation method which takes account interference types between communications.

DESCRIPTION OF THE INVENTION

The present invention is defined by a power allocation method for a wireless telecommunication system comprising at least a first couple of terminals consisting of a first transmitting terminal and a first receiving terminal and a second couple of terminals consisting of a second transmitting terminal and a second receiving terminal, a first communication between the terminals of the first couple using the same transmission resources as a second communication between the terminals of the second couple, so that both communications mutually interfere, wherein the first communication must meet a first set flow rate ($\rho_1$) and the second communication must meet a second set flow rate ($\rho_2$), characterised in that a control node of the system:

- determines, from an estimation of channel coefficients between the transmitting and receiving terminals, and for a transmission power range of the transmitting terminal, and a second transmission power range of the second transmitting terminal, a partition of an interference diagram of the first and second communications, into different areas, each area corresponding to a type of processing different from the interference;
- calculates, for each communication, the minimum transmission power curve enabling to perform interference processing in each said area, in view of the first and second set flow rates;
- determines, if any, the point of intersection of said minimum transmission power curves relating to the first and second communications;
- deduces from the coordinates of this point of intersection in the interference diagram, a first and a second transmission power values ($P^*_1, P^*_2$) to be allocated to the first and second transmitting terminals, respectively;
- transmits the first and second power values to the first and second transmitting terminals, respectively.

Advantageously, said control node further determines the area of said partition in which said intersection point is located, deduces therefrom the first and second interference types ($p^*, q^*$) for the first and second communications, and transmits (760) said first and second types to the first and second receiving terminals, respectively.

If the intersection of the minimum transmission power curves, relating to the first and second communications, is null, the control node informs the first and second transmitting terminals that a power allocation for said flow rate values is impossible.

Advantageously, said minimum transmission power curves are defined by intervals and consist of portions of straight lines on these intervals, and the control node determines the intersection between the power curves by searching for points of intersection between the straight lines relating to the first curve and the straight lines relating to the second curve, removing from all of the points of intersection thus obtained, those that do not belong to the corresponding segments, and selecting a point within all of the remaining points according to a predetermined criterion.

Said criterion is, for example, the minimum transmission power for the first and/or second communication(s).

Alternatively, the criterion may be the minimum sum of the transmission powers of the first and second communications.

Further alternatively, the criterion may be the minimum complexity of interference processings for the first and/or second communication(s).

Preferably, each receiving terminal estimates the channel coefficients between transmitting terminals and itself, and transmits the coefficients thus estimated to the control node.

Advantageously, each transmitting terminal transmits to the control node the flow rate value of the corresponding communication ($\rho_1, \rho_2$) as well as the maximum power ($P_1^{max}, P_2^{max}$) at which it can emit.

The invention also relates to a power allocation method for a wireless telecommunication system comprising a plurality of couples of terminals, each couple consisting of a transmitting terminal and a receiving terminal, wherein a control node initially allocates the same transmission power ($P^{com}$) to the transmitting terminals of said couples, and that for a communication, referred to as first communication, between the transmitting and receiving terminals of a couple, referred to as first couple, it is determined in a first step the communication, referred to as second communication, between the transmitting and receiving terminals of the couple, referred to as second couple, which causes the highest interference level on the first communication, and it is carried out, in a second step, the power allocation to the first and second transmitting terminals of said first and second communications by means of the allocation method according to one of the preceding claims, said first and second steps being repeated until a predetermined stop criterion is met.

The stop criterion can be a maximum number of iterations or a convergence criterion for consecutives powers allocated to the transmitting terminals of the couples of said plurality. In this second case, if the convergence criterion is not fulfilled at the end of the predetermined number of iterations, the second communication between the terminals of the second couple is assigned transmission resources different from those used by the first communication between the terminals of the first couple.

The invention also relates to a power allocation method for a wireless system comprising a plurality of couples of terminals, each couple consisting of a transmitting terminal an a receiving terminal, wherein said couples are matched according to a predetermined matching criterion in that, for each pair thus consisting of a first and second couples, the power allocation method set out above is applied, the interference due to communications other than those of the first and second couples being taken into account as thermal noise in said allocation method. Said criterion may be a degree of urgency, a priority order or a quality factor of a transmission channel. Transmission powers allocated to the transmitting terminals of couples of said plurality other than said first and second couples can be advantageously set to a predetermined minimum value ($P^{min}$).

BRIEF DESCRIPTION OF THE DRAWINGS

Further characteristics and advantages of the invention will become apparent upon reading a preferred embodiment of the invention, made in reference to the appended figures wherein.

DETAILED DESCRIPTION OF PARTICULAR EMBODIMENTS

It will be considered herein a wireless communication system comprising a plurality of couples of transmitting terminals and receiving terminals and it will be assumed that a communication between terminals of a couple may interfere with a communication between terminals of another couple, for example because these two communications use common transmission resources (intra-band interference). The wireless communication system may be, for example, a cellular communication system or an ad hoc communication system.

Figure 1:
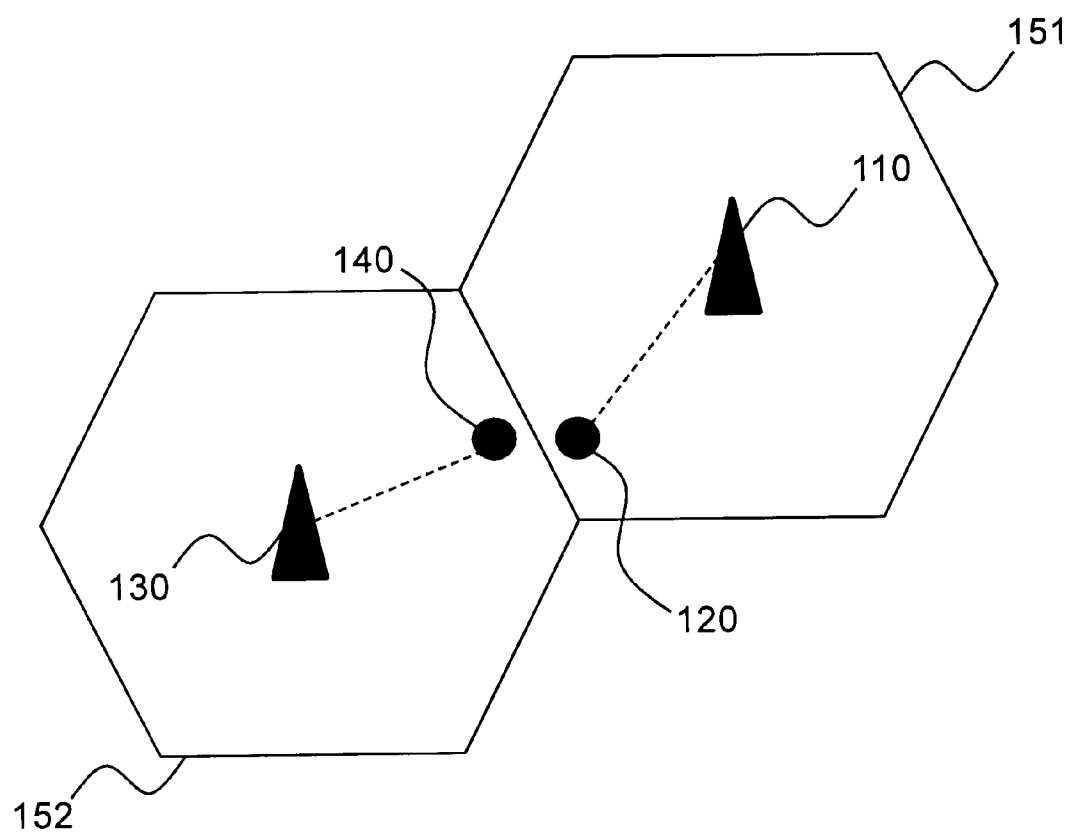
FIG. 1 schematically represents a situation of intra-band, inter-cell interference in a cellular communication system.

For the purpose of simplifying the presentation, let us consider first the case of a system only including two couples of terminals, as illustrated in FIG. 1.

Figure 2:
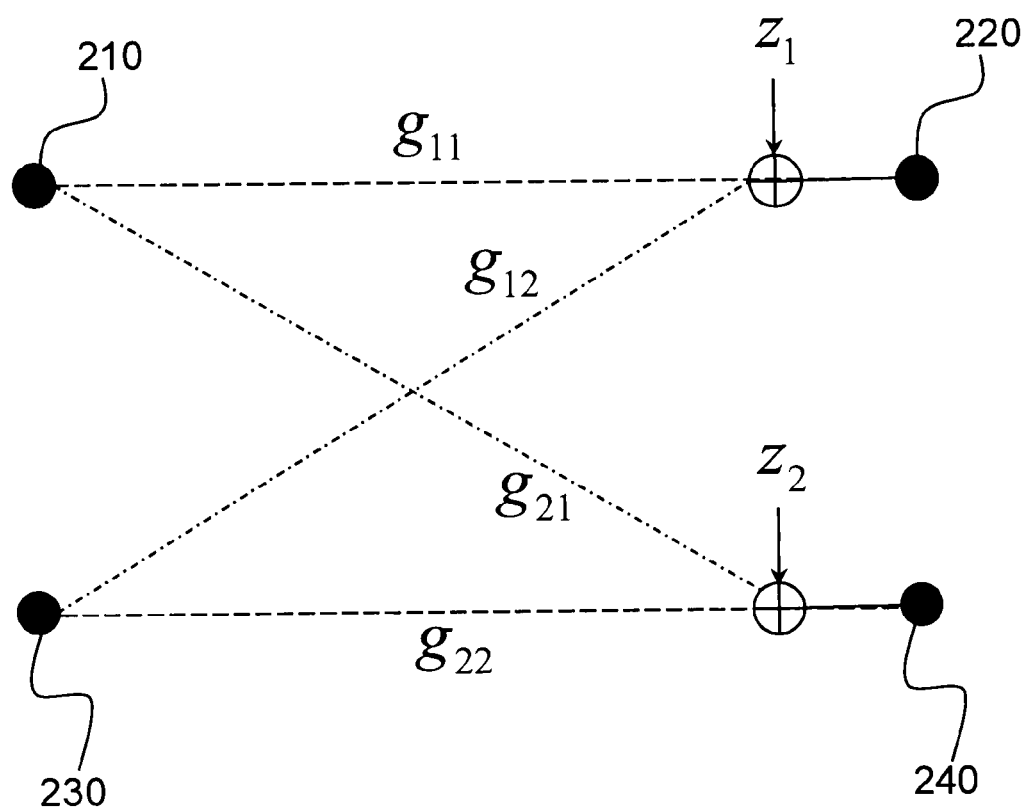
FIG. 2 schematically represents a model of the cellular communication system of FIG. 1.

FIG. 2 represents a model of telecommunication system of FIG. 1.

Let be $x_1$, $x_2$ the signals transmitted by the transmitting terminals 210 and 230 respectively, and $y_1$, $y_2$ the signals received by the receiving terminals 220 and 240 respectively, it follows:

$$y_1 = g_{11}x_1 + g_{12}x_2 + z_1$$

$$y_2 = g_{21}x_1 + g_{22}x_2 + z_2 \quad (1)$$

where $z_1$, $z_2$ are white Gaussian noise samples, $g_{11}$, $g_{21}$ are the channel coefficients between the transmitting terminal 210 and the receiving terminals 220 and 240, respectively, and $g_{22}$, $g_{12}$ are channel coefficients between the transmitting terminal 230 and the receiving terminals 240 and 220, respectively.

It will be understood that the interference between communications is represented in (1) by the crossed terms.

For the first communication, the respective powers of the information signal and of the interference due to the second communication are respectively $|g_{11}|^2 P_1$ and $|g_{12}|^2 P_2$.

It will be noted that this model is similar to the conventional model of so-called two-user Multiple Access Channel (MAC) such as described, for example, in the article of Shih-Chun Chang et al. entitled "Coding for T-User Multiple-Access Channels," IEEE Transactions on Information Theory, vol. IT-25, no. 6, pp. 684-691, November 1979.

However, it is fundamentally different in that in the MAC model, the receiving terminals receive a useful piece of information and not interference on "crossed" channels.

The signal to noise ratio (SNR) at the first receiver can be expressed as:

$$\gamma_1 = |g_{11}|^2 \frac{P_1}{N_0} \quad (2)$$

Similarly, the interference to noise ratio at the first receiver is actually:

$$\delta_1 = |g_{12}|^2 \frac{P_2}{N_0} \quad (3)$$

In the same way, the signal to noise and interference to noise ratios at the second receiver can be respectively written as:

$$\gamma_2 = |g_{22}|^2 \frac{P_2}{N_0} \quad (4)$$

$$\delta_2 = |g_{21}|^2 \frac{P_1}{N_0} \quad (5)$$

It will be noted that the following relationships are satisfied:

$$\delta_1 = f_2 \gamma_2 \text{ and } \delta_2 = f_1 \gamma_1 \quad (6)$$

where $$f_1 = \frac{|g_{21}|^2}{|g_{11}|^2} \text{ and } f_2 = \frac{|g_{12}|^2}{|g_{22}|^2}. \quad (6')$$

In the following, it will be noted $\rho_1$ and $\rho_2$ the respective flow rates on the first and second communications and the variables $C_1 = 2^{\rho_1} - 1$, $C_2 = 2^{\rho_2} - 1$ and $C_{12} = 2^{\rho_1 + \rho_2} - 1$ are introduced.

For a couple of given flow rates ($\rho_1$, $\rho_2$), several interference schemes may be distinguished, each scheme giving rise to a distinct processing. More precisely, as far as the first communication is concerned, the interference may be classified into three possible schemes.

Schematically, in a first scheme, power of the interference due to the second communication is lower than the information signal power received at the first receiving terminal. More precisely, if we consider the capacity according to Shannon, the signal to noise plus interference ratio on the direct channel between the transmitting terminal 210 and the receiving terminal 220 enables to pass the flow rate $\rho_1$ whereas the signal to noise ratio on the "crossed" channel between the transmitting terminal 230 and the receiving terminal 220 does not enable to pass the flow rate $\rho_2$ (the "crossed" channel is under a cut off situation according to the information theory), in other words:

$$\rho_1 \leq \log_2(1 + SINR_{11}) = \log_2\left(1 + \frac{\gamma_1}{1 + \delta_1}\right) \quad (7)$$

and $$\rho_2 > \log_2(1 + INR_{12}) = \log_2(1 + \delta_1) \quad (8)$$

where $SINR_{11}$ and $INR_{12}$ are the signal to noise plus interference ratio and interference to noise ratio, respectively, at the first receiving terminal.

The constraints on $\delta_1$ and $\gamma_1$ relating to the first scheme are deduced from (7) and (8):

$$\gamma_1 \geq C_1(1 + \delta_1) \quad (9)$$

$$\delta_1 < C_2 \quad (10)$$

Conversely, in a third scheme, the interference power is substantially higher than that of the information signal received by the first receiving terminal. Since the interference is due to the second communication, there is provided first to decode the information signal from the second communication, to estimate using this decoding signal, the interference due to this communication and to subtract it from the received signal. The information signal from the first communication is then decoded from the resulting signal, cleared from the interference.

In this scheme, in a first step, the signal from the first communication is considered as thermal noise and the information signal from the second communication is decoded. There appears consequently a situation symmetrical to that of the first scheme and the expression (7) is to be replaced by:

$$\rho_2 \leq \log_2(1 + SINR_{12}) = \log_2\left(1 + \frac{\delta_1}{1+\gamma_1}\right) \quad (11)$$

where $SINR_{12}$ is the signal to noise ratio at the receiving terminal 220 in which the signal is meant as the information signal from the second communication.

In a second step, once the contribution from the second communication has been subtracted from the received signal, there happens again the case of a signal simply noised by a thermal noise, in other words:

$$\rho_1 \leq \log_2(1+SNR_{11}) = \log_2(1+\gamma_1) \quad (12)$$

where $SNR_{11}$ is the signal to noise ratio after removing interference due to the second communication.

The expressions (11) and (12) are translated into the following constraints on $\gamma_1$ and $\delta_1$:

$$\gamma_1 \leq \frac{\delta_1}{C_2} - 1 \quad (13)$$

and $$\gamma_1 \geq C_1 \quad (14)$$

Finally, in a second scheme, the interference power is in the same order as that of the information signal. Thus, there is provided to jointly decode the information signal from the first communication and the information signal from the second communication at the first receiving terminal. The joint decoding of both information signals could, for example, be performed by means of a PIC scheme or a maximum likely decoding method of the MMSE-GDFE (Minimum Mean Square Error-Generalized Decision Feedback Equalizer) type, in a manner known per se.

This interference scheme is intermediate between the first and the third ones in so far as the flow rate $\rho_2$ does not satisfy (8) and (11) anymore, in other words:

$$\log_2\left(1 + \frac{\delta_1}{1+\gamma_1}\right) < \rho_2 \leq \log_2(1+\delta_1) \quad (15)$$

On the other hand, the joint decoding assumes that the flow rates from the first and second communications can be forwarded by the channel made from the direct channel and the crossed channel, that is:

$$\rho_1 + \rho_2 \leq \log_2(1+\gamma_1+\delta_1) \quad (16)$$

The constraints on $\gamma_1$ and $\delta_1$ relating to the second scheme are deduced from (15) and (16):

$$C_2 \leq \delta_1 < C_2(1+\gamma_1) \quad (17)$$

and $$\gamma_1 \geq C_{12} - \delta_1 \quad (18)$$

Figure 3:
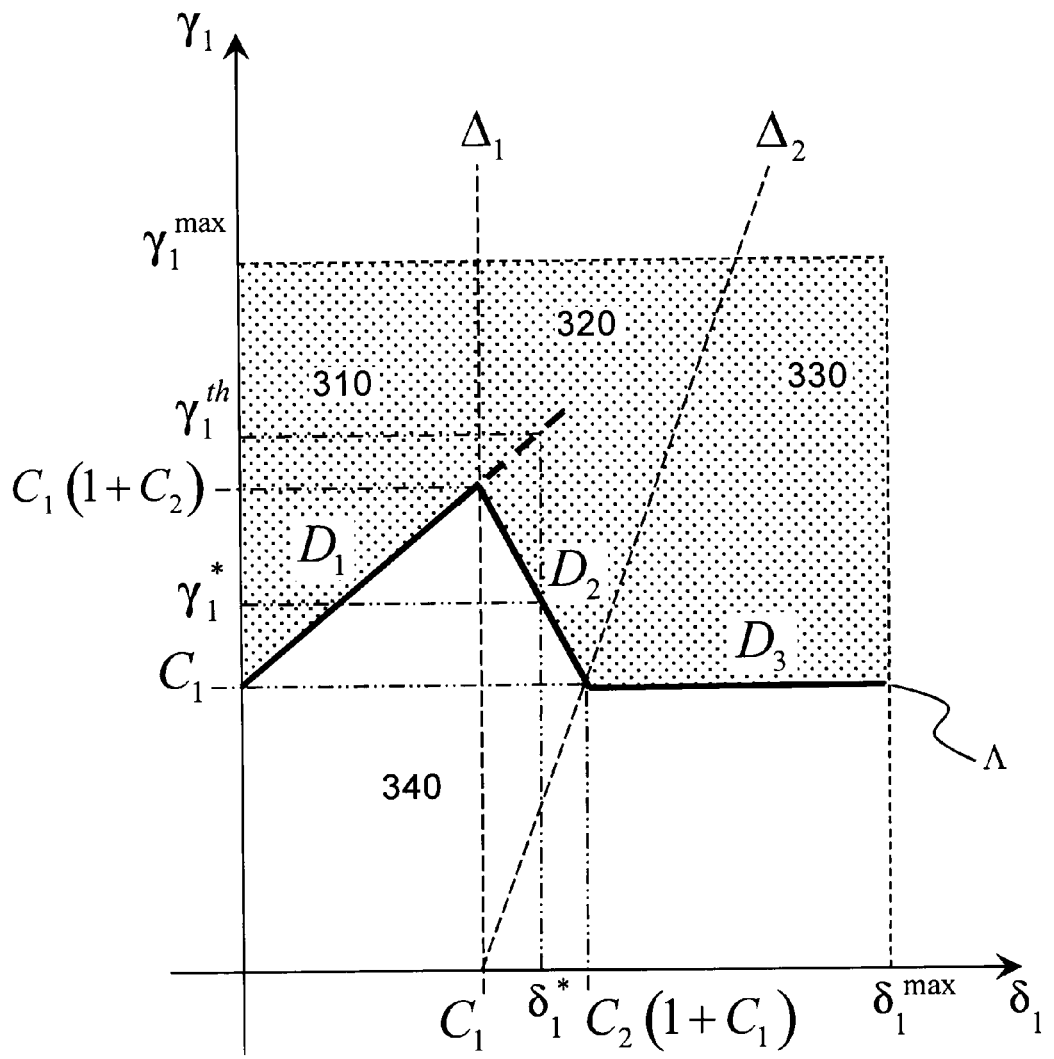
FIG. 3 schematically represents a first interference diagram for a first communication.

FIG. 3 shows an interference diagram wherein the interference to noise ratio $\delta_1$ is represented in abscissa and the power to noise ratio $\gamma_1$ is represented in ordinate.

This diagram is obtained for given values of flow rates $\rho_1$ and $\rho_2$, and consequently for given values of $C_1$, $C_2$, $C_{12}$.

The ratio $\gamma_1$ ranges from 0 to $\gamma_1^{max} = |g_{11}|^2 P_1^{max}/N_0$ and the ratio $\delta_1$ ranges from 0 to $\delta_1^{max} = |g_{12}|^2 P_m^{max}/N_0$ where $P_1^{max}$ and $P_2^{max}$ are the maximum transmission powers of the terminals 210 and 230 respectively.

The straight lines $\Delta_1$ and $\Delta_2$ defined by the equations $\delta_1 = C_2$ (cf. (10)) and $$\gamma_1 = \frac{\delta_1}{C_2} - 1$$

(cf. (13)) bound the three interference schemes. The straight lines $D_1$, $D_2$, $D_3$, respectively defined by the equations $\gamma_1 = C_1(1+\delta_1)$ (cf. (9)); $\gamma_1 = C_{12} - \delta_1$ (cf. (18)); $\gamma_1 = C_1$ (cf. (14)); give the lower power boundary, noted $\Lambda$, for each of these schemes. The area 310 corresponding to the first interference scheme is bounded by the straight lines $D_1$ and $\Delta_1$ as well as the ordinate axis, the one corresponding to the second interference scheme 320 is bounded by the straight lines $\Delta_1$, $\Delta_2$ and $D_2$, and finally the one, 330, corresponding to the third interference scheme is bounded by $\Delta_2$ and $D_3$.

Below the lower boundary $\Lambda$ is located a fourth area (340) in which the interference cannot be processed for the required quality of service, herein for the flow rates $\rho_1$ and $\rho_2$. Another transmission resource could then be used, for example another transmission time interval to remove the interference between both communications.

If the flow rate of the first or second communication varies, the parameters of the equations of the straight lines $D_1$, $D_2$, $D_3$ and $\Delta_1$, $\Delta_2$ also vary and, consequently, the areas corresponding to the different interference schemes are changed.

For given flow rates $\rho_1$ and $\rho_2$, it can be determined from one estimation, at the receiver, from the information signal power, from the interference power and that of the thermal noise, in which interference scheme this happens, and the processing relevant to this area can be performed.

Moreover, as indicated in the figure, for given flow rates $\rho_1$ and $\rho_2$, it can be determined for each interference power, $\delta_1$, the lowest value of $\gamma_1$, designated herein by $\gamma^*_1$, enabling to process this interference. In other words, for a given transmission power of the terminal 230, the minimum power $$P^*_1 = \frac{N_0}{|g_{11}|^2} \gamma^*_1$$

can be allocated to the transmitting terminal 210. It will be noted that if this happens in the area 320 or 330, this allocated power value is much lower than that, designated herein by $\gamma_1^{th}$, that would have to be allocated if the interference was considered as simple thermal noise.

Figure 4:
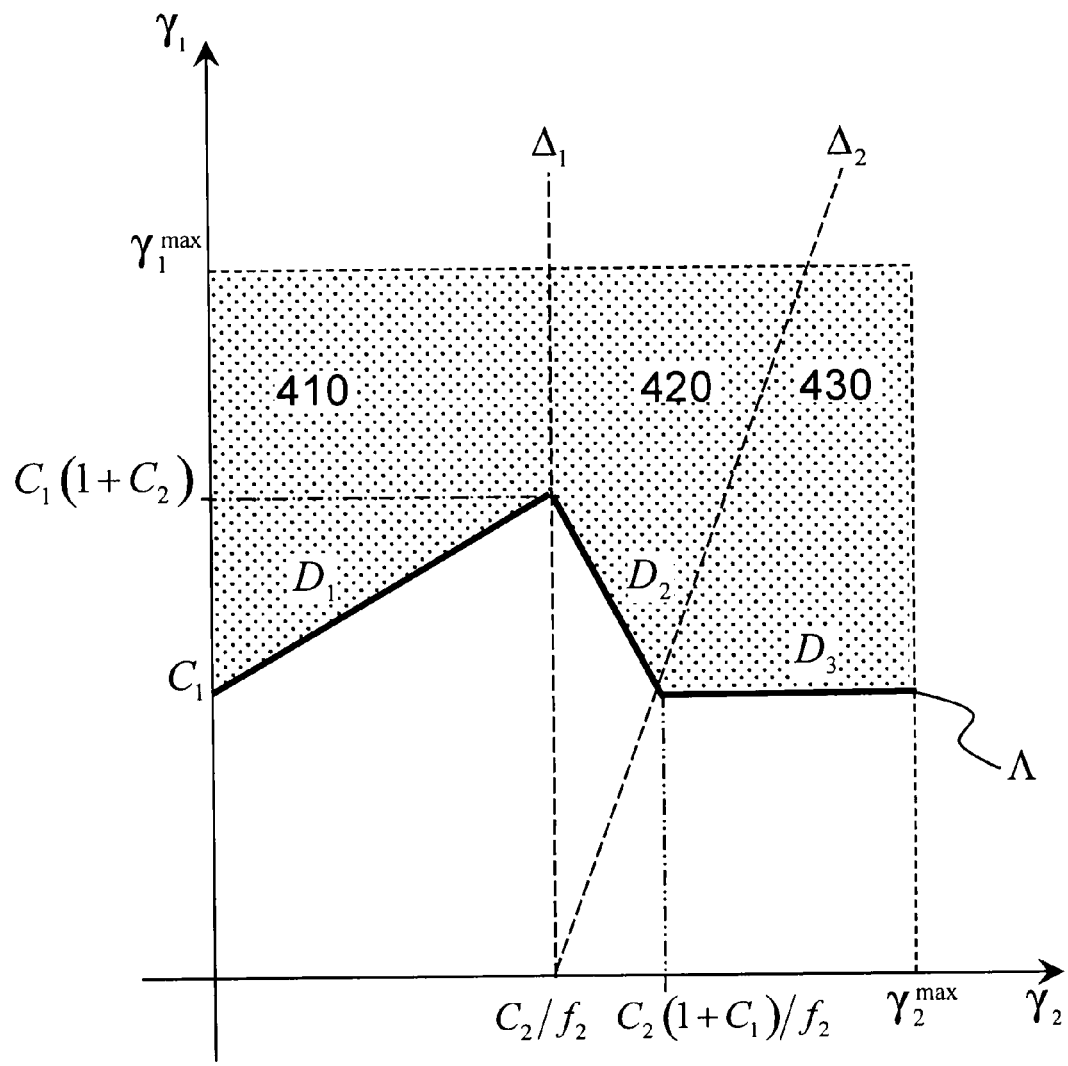
FIG. 4 schematically represents a second interference diagram for this same communication.

FIG. 4 shows an interference diagram wherein, this time, the power to noise ratio $\gamma_2$ is represented in abscissa and the power to noise ratio $\gamma_1$ is represented in ordinate.

The ratio $\gamma_1$ ranges from 0 to $\gamma_1^{max} = |g_{11}|^2 P_1^{max}/N_0$ and the ratio $\gamma_2$ ranges from 0 to $\gamma_2^{max} = |g_{22}|^2 P_2^{max}/N_0$.

The inequalities (9), (13) and (18) can be rewritten as a function of the ratios $\gamma_1$ and $\gamma_2$:

$$\gamma_1 \geq C_1(1+f_2\gamma_2) \quad (19)$$

$$\gamma_1 \leq \frac{f_2}{C_2}\gamma_2 - 1 \quad (20)$$

$$\gamma_1 \geq C_{12} - f_2\gamma_2 \quad (21)$$

Similarly to FIG. 3, the straight lines $\Delta_1$ and $\Delta_2$ defined by the equations $\gamma_2 = C_2/f_2$ (cf. (10)) and $$\gamma_1 = \frac{f_2}{C_2}\gamma_2 - 1$$

(cf. (20)), bound the three interference schemes and the straight lines $D_1$, $D_2$, $D_3$, respectively defined by the equations $\gamma_1 = C_1(1+f_2\gamma_2)$ (cf. (19)); $\gamma_1 = C_{12} - f_2\gamma_2$ (cf. (21)); $\gamma_1 = C_1$ (cf. (14)); give the lower power boundary, $\Lambda$. The areas corresponding to the different interference schemes are designated by 410, 420 and 430.

Figure 5:
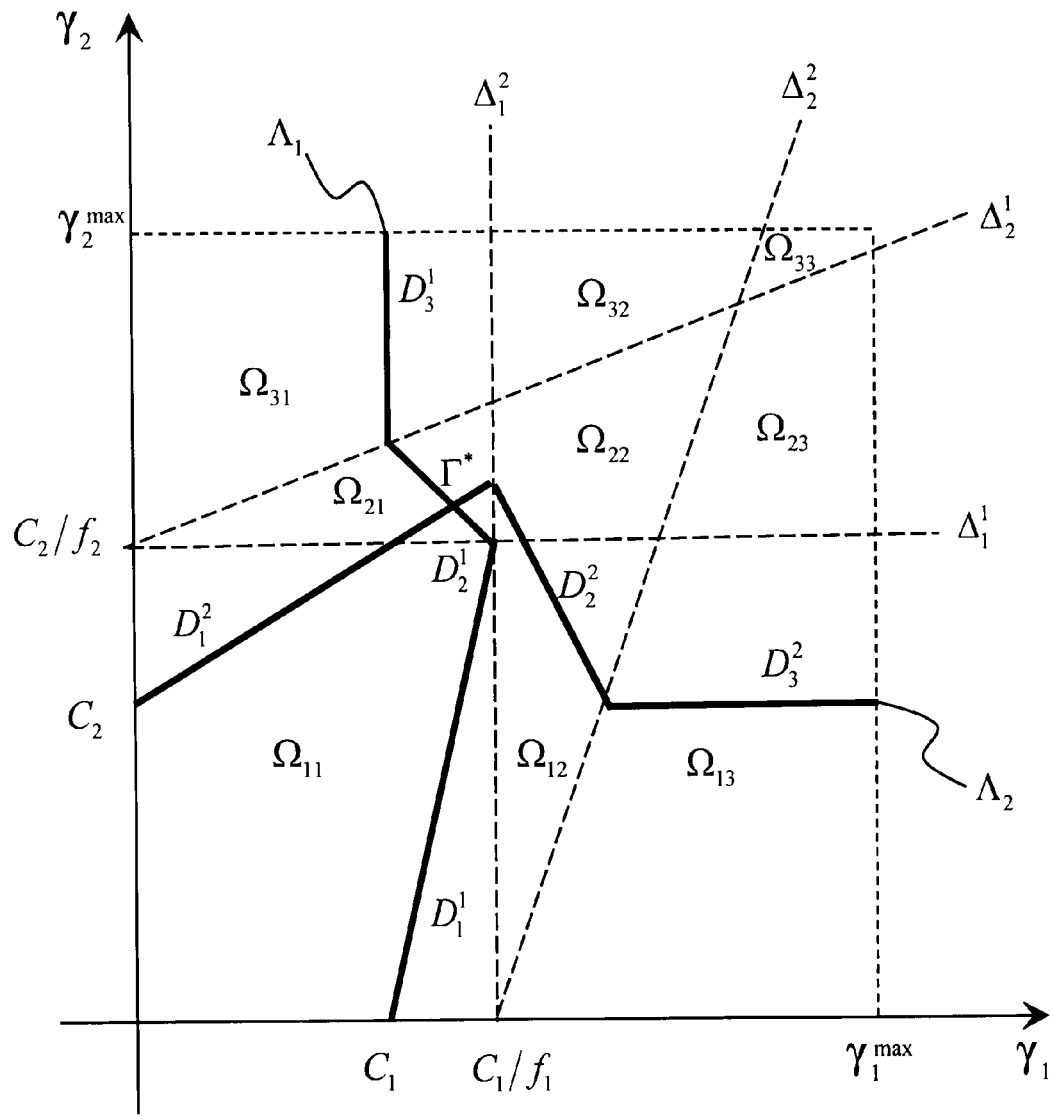
FIG. 5 schematically represents an interference diagram for a first and second communications.

FIG. 5 represents an interference diagram identical to that of FIG. 4 wherein the different interference schemes are indicated for both communications. The signal to noise ratio $\gamma_1$ is drawn is abscissa and the signal to noise ratio $\gamma_2$ in ordinate. There is obtained nine distinct areas, obtained by intersecting the three areas relating to the first communication and the three areas relating to the second communication. These nine areas are noted $\Omega_{pq}$, $1 \leq p \leq 3$, $1 \leq q \leq 3$, where p and q index the interference scheme from the first and the second communications respectively. The different areas are bounded by the straight lines $\Delta_1^1, \Delta_2^1, \Delta_1^2, \Delta_2^2, D_1^1, D_2^1, D_3^1$, and $D_1^2, D_2^2, D_3^2$ where the higher subscripts here indicate the communication.

The lower boundaries, $\Lambda_1$ and $\Lambda_2$, relating to both communications, intersect at a point $\Gamma^* = (\gamma^*_1, \gamma^*_2)$. For given communication flow rates $\rho_1$ and $\rho_2$, the point $\Gamma^*$ corresponds to the minimum power allocation. Generally, the area $\Omega_{p^*q^*}$ wherein the point $\Gamma^*$ is located provides the interference schemes p*,q* of both communications and consequently the types of processing to be applied at the corresponding receiving terminals. It will be noted that in the illustrated case, it is the area $\Omega_{21}$ that contains the operating point, in other words in order to decode the information signal from the first communication, a joint decoding (at the first receiving terminal) will be carried out, and in order to decode the information signal from the second communication, (at the second receiving terminal), the first communication will be considered as thermal noise.

Figure 6:
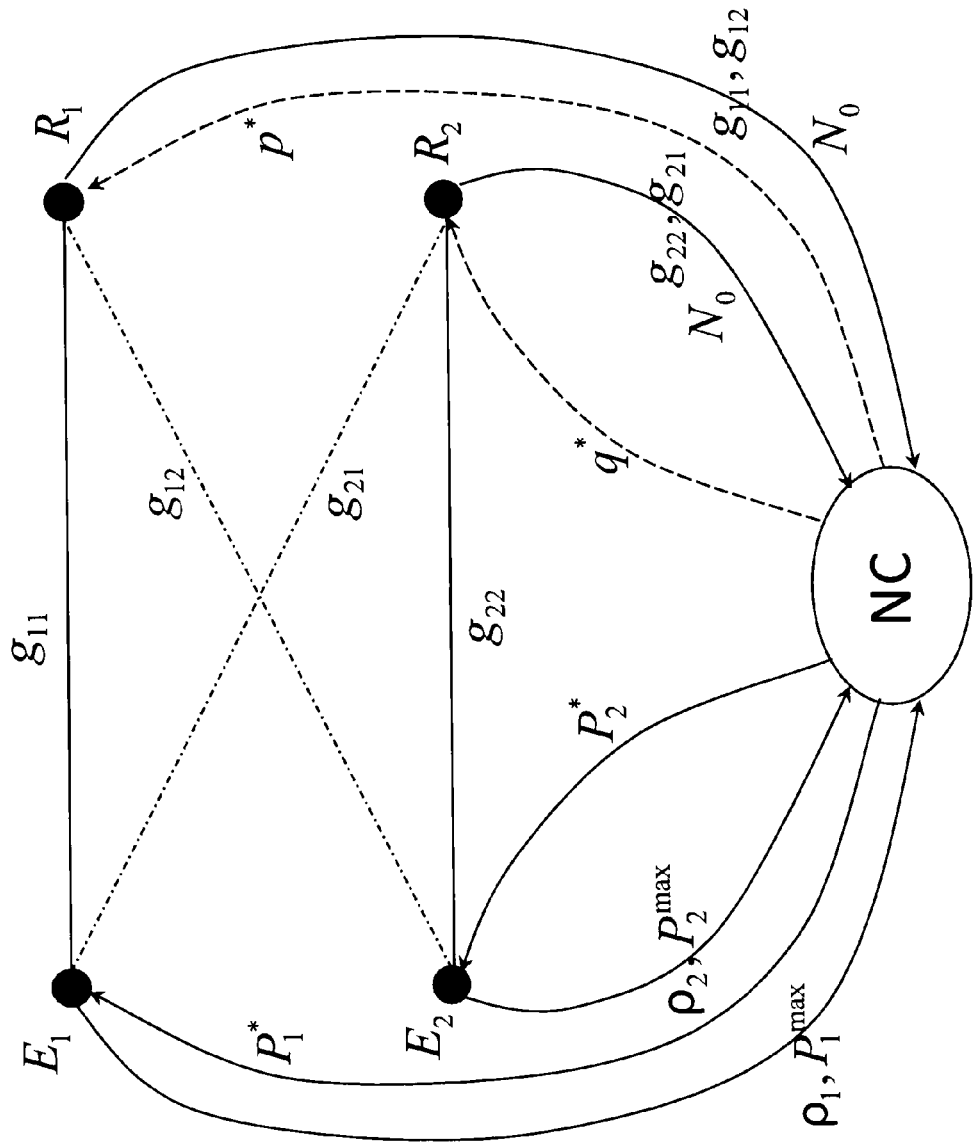
FIG. 6 schematically represents exchanges between terminals and a control node in the case of a telecommunication system of FIG. 1.

FIG. 6 schematically represents exchanges between both couples of terminals $T_1 = (E_1, R_1)$, $T_2 = (E_2, R_2)$ and the control node being in charge of allocating power, noted NC (Network Controller).

The transmitting terminals $E_1$ and $E_2$ transmit to the control node their respective set flow rates $\rho_1$ and $\rho_2$, that is the desired flow rates to set the first and second communications. They also transmit if necessary the maximum powers $P_1^{max}$ and $P_2^{max}$ at which they can transmit. Alternatively, these maximum power values are known to the control node, for example if they have been provided by the admission procedure in the network.

Besides, the receiving terminals $R_1$ and $R_2$ respectively estimate the channel coefficients $g_{11}, g_{12}$ and $g_{22}, g_{21}$, for example using pilot symbols transmitted by $E_1$ and $E_2$, in a manner known per se. These channel coefficients are then transmitted to the control node NC.

The control node NC receives (or knows) the maximum powers $P_1^{max}$ and $P_2^{max}$, the set flow rates $\rho_1$ and $\rho_2$ as well as the above-mentioned channel coefficients. On the other hand, it receives from the receiving terminals a power estimation of the thermal noise $N_0$, for example by means of a pilot symbol sequence.

The control node then determines the transmission powers $P^*_1$, $P^*_2$ to be allocated to the terminals $E_1$ and $E_2$ respectively to fulfil the flow rates $\rho_1$ and $\rho_2$, according to the method described below. It transmits the values $P^*_1$, $P^*_2$ thus determined to the terminals $E_1$ and $E_2$ respectively.

It will be understood that the information transmission between the control node NC and the terminals $E_1$ and $E_2$, or $R_1$ and $R_2$ could happen via a wired link or a radio link as the case may be. For example, if $E_1$ and $E_2$ are base stations and $R_1$ and $R_2$, the information exchanged with the first ones could be routed by the backhaul network whereas the information exchanged with the second ones could be routed thanks to auxiliary radio channels.

Figure 7:
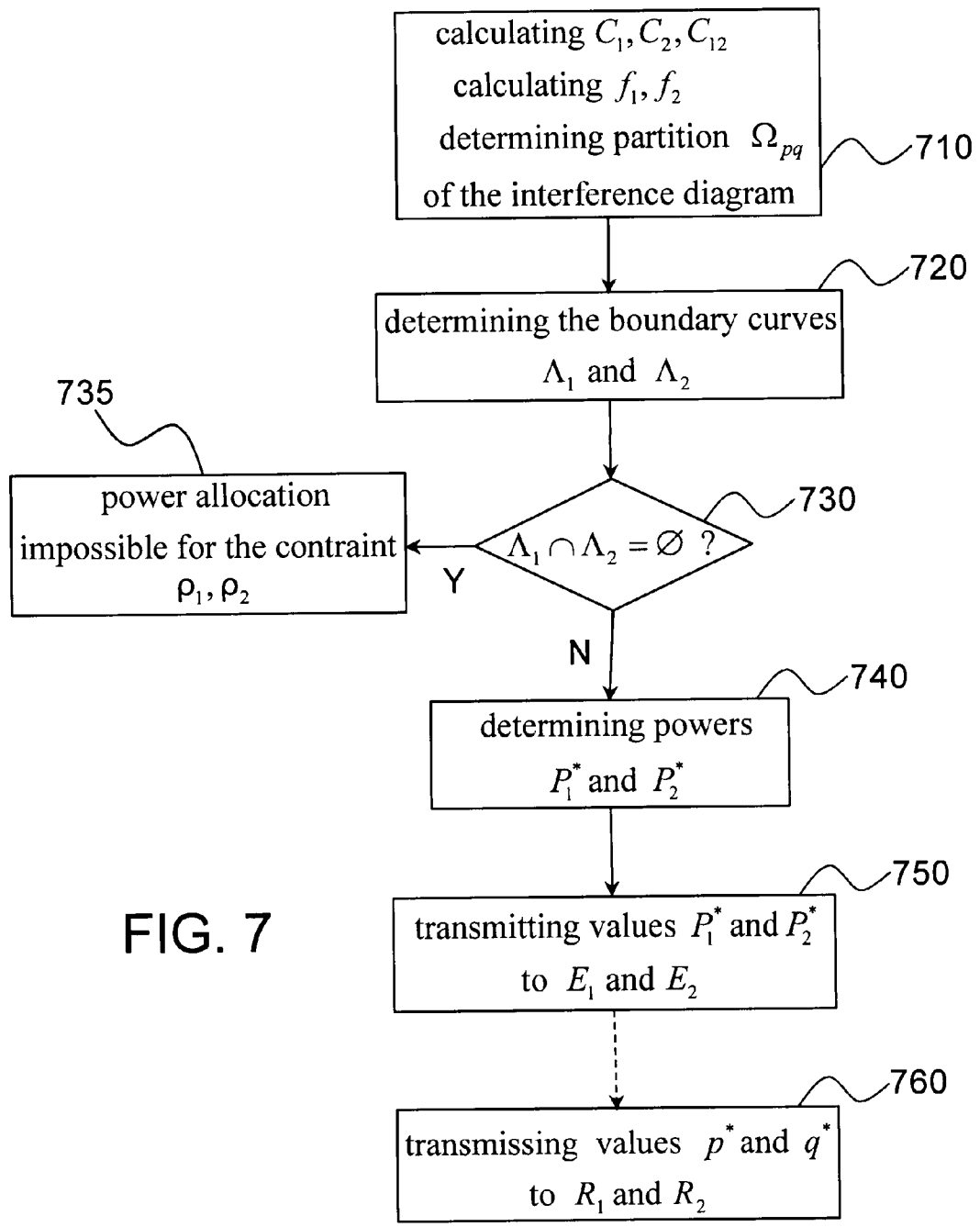
FIG. 7 schematically represents a centralised power allocation method according to one embodiment of the invention.

FIG. 7 represents a centralised power allocation method according to a first embodiment of the invention. This embodiment assumes that two couples of terminals $T_1 = (E_1, R_1)$, $T = (E_2, R_2)$ have been selected beforehand because their communications mutually interfere.

In step 710, the control node first calculates the variables $C_1, C_2, C_{12}$ from the flow rates $\rho_1$ and $\rho_2$ and the factors $f_1, f_2$ from the channel coefficients. It then deduces a partition of the interference diagram relating to both communications. More precisely, for each communication i=1, 2, it first determines a partition $(\omega_1^1, \omega_2^1, \omega_3^1)$ of the interference diagram defined by:

$$\omega_1^1 \square \{(\gamma_i, \gamma_j) | 0 < \gamma_j \leq C_j/f_j\} \quad (22)$$

$$\omega_2^1 \square \{(\gamma_i, \gamma_j) | C_j/f_j \leq \gamma_j \leq (\gamma_j + 1)C_j/f_j\} \quad (23)$$

$$\omega_3^1 \{(\gamma_i, \gamma_j) | \gamma_j > (\gamma_j + 1)C_j/f_j\} \quad (24)$$

where $j \neq i$ is the interfering communication subscript.

The partition of the interference diagram for both communications is obtained by means of the intersections:

$$\Omega_{pq} = \omega_p^1 \cap \omega_q^2 \quad (25)$$

Each area is associated with an interference scheme (indexed by p) of the first communication and with an interference scheme (indexed by q) of the second communication.

In step 720, the control node determines, for each communication, the curve giving the lower power bound compatible with the interference processing, in each of the areas $(\omega_1^1, \omega_2^1, \omega_3^1)$.

More precisely, for the communication i, the curve $\Lambda_i$ giving the lower power bound is defined par intervals:

$$\gamma_i = C_i(1 + f_j\gamma_j) \text{ for } 0 \leq \gamma_j \leq C_j/f_j \quad (26)$$

$$\gamma_i = C_{ij} - f_j\gamma_j \text{ for } C_j/f_j \leq \gamma_j \leq C_j(1 + C_i)/f_j \quad (27)$$

$$\gamma_i = C_i \text{ for } C_j(1 + C_i)/f_j \leq \gamma_j \leq \gamma_j^{max} \quad (28)$$

Each curve $\Lambda_1$ thus consists of three segments, defined by (26), (27) and (28) respectively. The segments of $\Lambda_1$ are noted $\lambda_1^p$, p=1, 2, 3 and those of $\Lambda_2$ are noted $\lambda_2^q$, q=1, 2, 3. It will be understood that, depending on the $\gamma_j^{max}$ value, two or even one single interval(s) may exist.

In step 730, the control node determines whether the curves $\Lambda_1$ and $\Lambda_2$ intersect in the box $[0, \gamma_1^{max}] \times [0, \gamma_2^{max}]$ or more generally in a box $[\gamma_1^{min}, \gamma_1^{max}] \times [\gamma_2^{min}, \gamma_2^{max}]$ where $\gamma_1^{min}$ and $\gamma_2^{min}$ are signal to noise ratio values corresponding to minimum predetermined power values. For example, $\gamma_1^{min} = \gamma_2^{min} = 0$ could be possible. If the curves do not intersect, no power allocation meeting the flow rate constraints can be carried out, in view of the interference conditions. The control node NC detects this situation and informs the terminals $E_1$, $E_2$ about it. In this case, an alternative strategy should be assumed. For example, either or both terminals can require a lower set flow rate. Alternatively, orthogonal transmission resources (distinct transmission intervals, distinct subcarrier intervals, etc.) may be allocated to both communications concerned so as to remove interference.

In step 740, when the curves $\Lambda_1$ and $\Lambda_2$ intersect in the box $[\gamma_1^{min}, \gamma_1^{max}] \times [\gamma_2^{min}, \gamma_2^{max}]$, the coordinates of the point of intersection $\Gamma^*=(\gamma^*_1,\gamma^*_2)$ is determined. This point is located in the interference area $\Omega^{p^*q^*}$.

The value $\gamma^*_1$ enables to calculate the minimum transmission power to be allocated to the terminal $E_1$:

$$P_1^* = \frac{N_0}{|g_{11}|^2}\gamma_1^* \qquad (29)$$

and in the same way, the value $\gamma^*_2$ enables to calculate the power to be allocated to the terminal $E_2$:

$$P_2^* = \frac{N_0}{|g_{22}|^2}\gamma_2^* \qquad (30)$$

Besides, the subscripts p* and q* give the processing type of the interference to be assumed for the terminals $R_1$ and $R_2$.

In step 750, the control node informs the terminals $E_1$ and $E_2$ about the allocated powers $P^*_1$ and $P^*_2$. If need be, it also transmits in 760 to the terminals $R_1$ and $R_2$ the types p* and q* of the processing they will have to carry out for the interference. It will be noted that the latter transmission, even though advantageous, is optional, as indicated with dashed lines in FIGS. 6 and 7. Indeed, the terminals $R_1$ and $R_2$ can estimate the information signal power aimed thereat as well as the interference signal power to autonomously deduce therefrom in which interference scheme they are located.

The above described steps 720 and 730 enable to determine the intersection of the curves $\Lambda_1$ and $\Lambda_2$. This intersection can be obtained in different manners for example by minimising a cost function thanks to the simplex algorithm.

Advantageously, a direct resolution as explained in connection with FIG. 8 could be performed.

Figure 8:
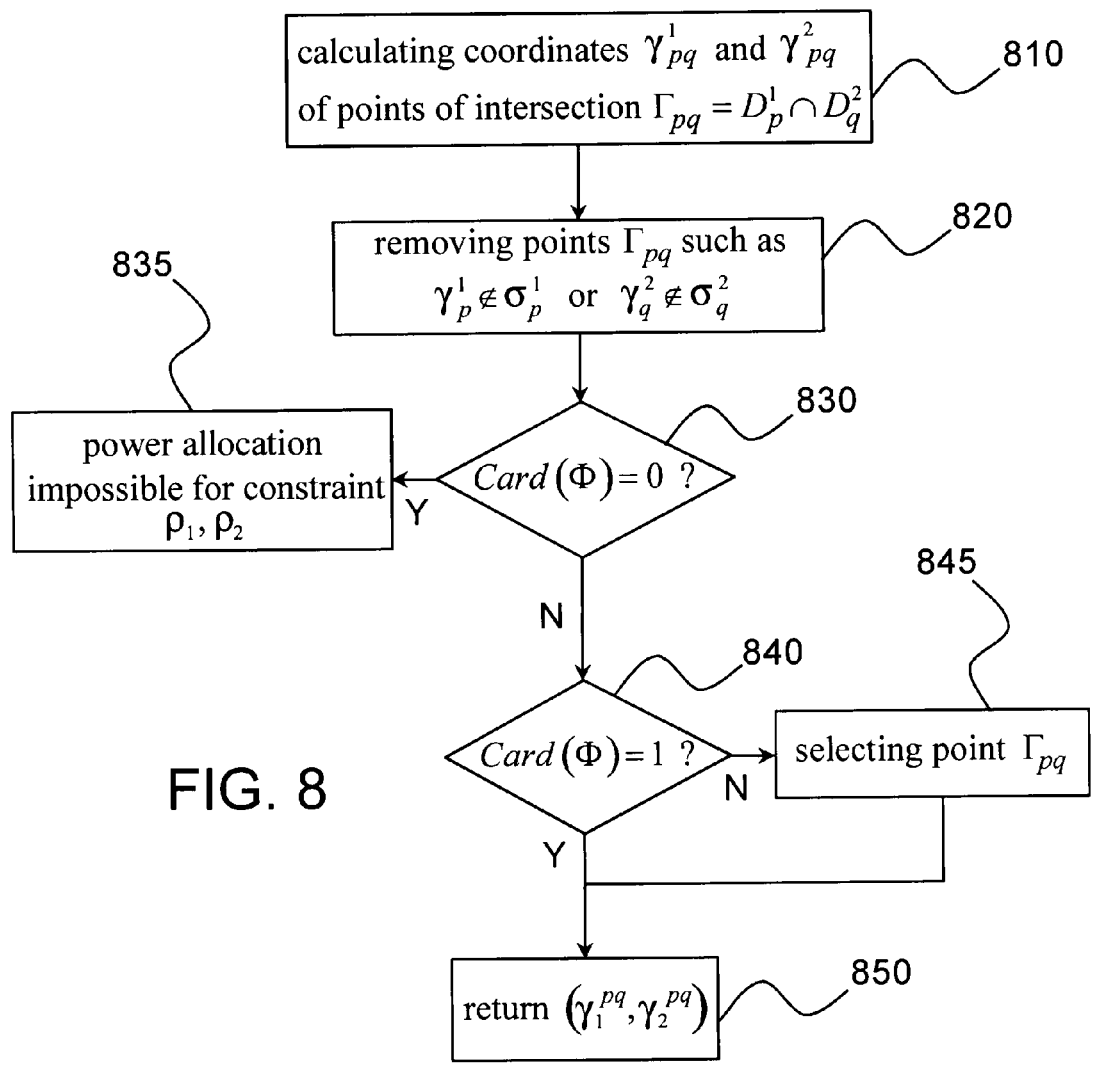
FIG. 8 schematically represents a method for determining the intersection of two curves defined in pieces, useful for the method of FIG. 7.

FIG. 8 schematically represents a flowchart for a method enabling to simply determine the intersection of curves $\Lambda_1$ and $\Lambda_2$ in the box $[\gamma_1^{min},\gamma_1^{max}]\times[\gamma_2^{min},\gamma_2^{max}]$, if any.

As seen above, each curve $\Lambda_1$ relating to the communication $E_1$ and $R_1$, is generally made from three line segments defined by (26), (27) and (28). The intervals on which is defined the curve $\Lambda_1$ are noted $\sigma_p^2$, p=1, 2, 3, with:

$\sigma_1^2=[\gamma_2^{min},C_2/f_2]$ $\sigma_2^2=[C_2/f_2,C_2(1+C_1)/f_2]$ $\sigma_3^2=[C_2(1+C_1)/f_2,\gamma_2^{max}] \qquad (31)$ and, the curve $\Lambda_2$ is likewise defined by the intervals $\sigma_q^2$, q=1, 2, 3:

$\sigma_1^1=[\gamma_1^{min},C_1/f_1]$ $\sigma_2^1=[C_1/f_1,C_1(1+C_2)/f_1]$ $\sigma_3^1=[C_1(1+C_2)/f_1,\gamma_1^{max}] \qquad (32)$ If, on the one hand, the straight lines $D_1^1,D_2^1,D_3^1$ respectively defined by the equations are considered:

$\gamma_1=C_1(1+f_2\gamma_2)$ $\gamma_1=C_{12}-f_2\gamma_2$ $\gamma_1=C_1 \qquad (33)$ and, on the other hand, the straight lines $D_1^2$, $D_2^2$, $D_3^2$, respectively defined by the equations are considered:

$\gamma_2=C_2(1+f_1\gamma_1)$ $\gamma_2=C_{12}-f_1\gamma_1$ $\gamma_2=C_2 \qquad (34)$ the nine points of intersection $\Gamma_{pq}=D_p^1\cap D_q^2$, with p=1, 2, 3 and q=1, 2, 3 can easily be calculated. The whole set of points of intersection is noted as $\Phi$.

The coordinates $\gamma_1^{pq}$ and $\gamma_2^{pq}$ of these nine points of intersection are calculated in step 810.

In step 820, it is checked that the coordinates $\gamma_1^{pq}$ and $\gamma_2^{pq}$ of the points $\Gamma_{pq}$ respectively belong to the intervals $\sigma_p^1$ and $\sigma_q^2$, in other words that it is actually an intersection of segments $\lambda_p^1$ and $\lambda_q^1$. The points $\Gamma_{pq}$ that do not satisfy this condition are removed from $\Phi$.

In step 830, it is determined whether the set $\Phi$ is empty. If so, it is concluded in 835 that a power allocation meeting the flow rate constraints $\rho_1$ and $\rho_2$ is impossible and an alternative strategy is assumed as explained above.

Otherwise, it is checked in 840 that the set $\Phi$ is reduced to a singleton.

If so, the coordinates of this point are returned to 850.

On the other hand, if $\Phi$ contains several points of intersection, one of them is selected in 845 according to a predetermined criterion, for example the one which results in the lowest transmission power sum for $E_1$ and $E_2$, or which will results in the simplest interference processing in $R_1$ and $R_2$. Once again, the coordinates of the selected point are returned to 850.

The power allocation method according to the invention is generalised to any number K of couples of terminals and thus to a number K of corresponding communications. The interference diagram of FIG. 4 or 5 is thus constructed in the space with K≥2 dimensions and there are $P^K$ possible combinations of P interference schemes for all the K communications of the system. The flow rate set points of the K communications form a flow rate vector $\rho=(\rho_1,\ldots,\rho_K)^T$. The issue as to allocating power is then to find the point $\Gamma^*$ with coordinates $(\gamma^*_1,\ldots\gamma^*_K)$ enabling to forward the flow rates concerned with the lowest possible energy consumption. This point is obtained by intersecting PK hyperplanes in the K dimension-space of the signal to noise $\gamma_1,\ldots,\gamma_K$ ratios. It will be noted that, in the case of K=2, a hyperplane corresponds to a straight line such as defined in (33) or (34). Then, $P^K$ possible candidates are obtained and a removing step and, if necessary, a selection step, as explained above, are carried out.

Since the number $P^K$ can be very high, suboptimal but easier to be implemented alternatives may be chosen.

According to a first alternative, the couples of transmitting and receiving terminals, $T_k=(E_k,R_k)$, k=1, ..., K are pooled by pairs according to a predetermined criterion. For example, this criterion can be a priority order, a degree of urgency, a channel quality factor, etc. or a combination thereof.

If the selection criterion is a channel quality factor, preferably, for a given couple $T_k$, the couple $T_{k'}$ is selected such that the ratio $$\tilde{f}_k^{k'} = \frac{|g_{kk'}|}{|g_{kk}|}$$

is the highest where $g_{kk'}$ is the "crossed" channel coefficient between $E_{k'}$ and $R_k$ and $g_{kk}$ is the direct channel coefficient between $E_k$ and $R_k$. Indeed, it is understood that the communication k' of the couple $T_{k'}$ is likely to be the highest interference to the communication k. The couples $T_k$ and $T_{k'}$ are then paired.

For a thus constituted pair $(T_k, T_{k'})$, the other pairs could be considered as only weakly interfering. The "residual" interference due to other communications will be processed as thermal noise. This thermal noise will be taken into account in the $N_0$ value for calculating powers $P^*_k$ and $P^*_{k'}$ to be allocated to the terminals $E_k$ and $E_{k'}$.

In order to ensure that this hypothesis is well satisfied, a null power, or even a minimum power $P^{min}$ could be allocated to the other terminals $E_v$, $v \neq k, k'$ while the communications k and k' are active.

The process for selecting the active pair $(T_k, T_{k'})$ can be periodically repeated, in particular to take account of the evolution of channel coefficients. It can also be repeated to satisfy an equity principle, the constituent couples of the lastly selected pair being then excluded from the selection process for a given period. This exclusion period can be a function of the quality of service required for the communication concerned, the higher the quality of service, the shorter an exclusion period.

Figure 9:
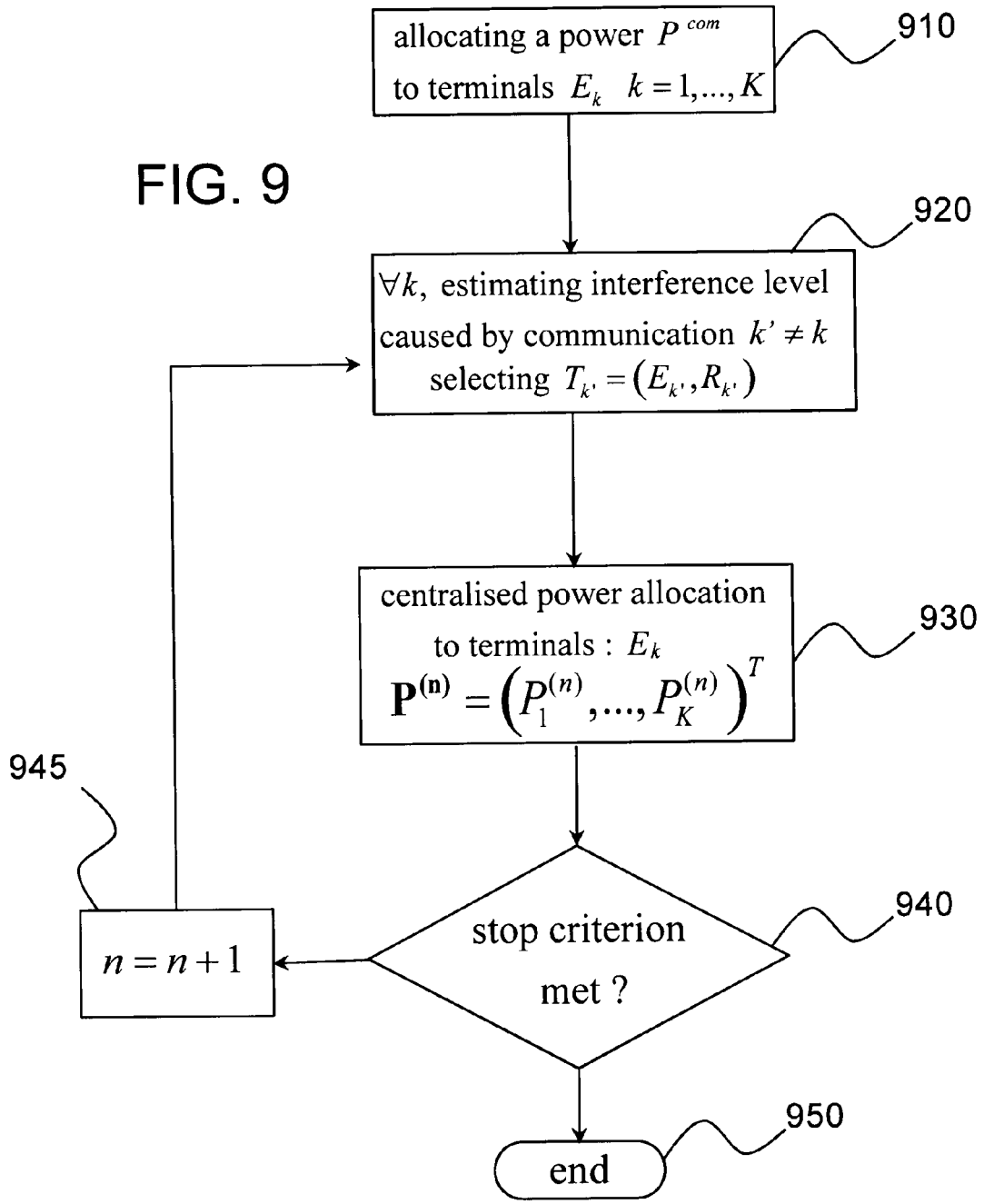
FIG. 9 schematically represents an iterative power allocation method for a plurality of couples of transmitting and receiving terminals.

According to another alternative embodiment, illustrated in FIG. 9, a power allocation is performed iteratively.

A plurality K of couples of terminals $T_k=(E_k, R_k)$, is again considered, $R_k$ being in communication k with $E_k$.

In a first step, 910, a same initial transmission power, $P^{com}$, is allocated to all the transmitting terminals $E_k$, $k=1, \ldots, K$. An iteration loop is then initiated.

In step 920, each terminal $R_k$ measures the interference level caused by each of the communications $k' \neq k$. These interference levels could in particular be measured using short pilot symbol sequences, transmitted by the terminals $E_{k'}$, $k' \neq k$ in turn. The couple of terminals $T_{k'}=(E_{k'},R_{k'})$ causing the highest interference level is selected and $T_k$ and $T_{k'}$ are paired.

In step 930, for each pair $(T_k,T_{k'})$, a power allocation according to the method illustrated in FIG. 7 is performed. However, the interference caused by other communications $\hat{k} \neq k,k'$ is here taken into account as thermal noise. More precisely, the power of the thermal noise $N_0$ intervening in expressions (2) to (5) is then increased by the power of interference caused by the communications $\hat{k} \neq k,k'$. At the end of this step, each of the transmitting terminals transmits with the power allocated thereto, which changes the interference level on the different communications.

Steps 920 and 930 are repeated until a stop criterion is met.

This stop criterion can be seen as a maximum number $N^{max}$ of iterations.

Alternatively, the stop criterion may be a convergence measure. For example, let $P_k^{(n)}$ be the transmission power allocated to the terminal $E_k$ at iteration n, then this criterion could be expressed as:

$$\|P^{(n+1)} - P^{(n)}\| \leq \epsilon \quad (35)$$

where $P^{(n)}$ is the vector of the powers allocated to the terminals at the iteration n, that is $P^{(n)} = (P_1^{(n)}, \ldots, P_K^{(n)})^T$ and where $\epsilon$ is a predetermined threshold value.

It is tested in 940 whether the stop criterion is satisfied. If not, the process proceeds to 920. If so, this ends in 950. The last transmission power values $P_1^{(last\_n)}, \ldots, P_K^{(last\_n)}$ still are allocated to the terminals J.

In case the iterative power allocation process does not converge, the set of couples $(T_k,T_{k'})$ may be split into subsets, such that the communication associated with any couple of a first subset does not interfere much with the communication associated with any couple of a second subset. The iterative power allocation process is then independently applied to each subset.

The present invention has been described as a centralised power allocation method meeting a given flow rate constraint. However, those skilled in the art will understand that it is applicable to a power allocation meeting a constraint on any quality of service parameter, for example a maximum latency time, a minimum covering radius, a maximum error rate, etc. without departing from the scope of the present invention.

The invention claimed is:

1. A power allocation method for a wireless telecommunication system including at least a first couple of terminals consisting of a first transmitting terminal and a first receiving terminal and a second couple of terminals consisting of a second transmitting terminal and a second receiving terminal, a first communication between the first transmitting and the first receiving terminals of the first couple using the same transmission resources as a second communication between the second transmitting and the second receiving terminals of the second couple, so that both communications mutually interfere, wherein the first communication meets a first set flow rate ($\rho_1$) and the second communication meets a second set flow rate ($\rho_2$), wherein a control node performs the following power allocation steps comprising:

determining, from an estimation of channel coefficients between the first transmitting and the first receiving terminals, and for a first transmission power range of the first transmitting terminal, and for a second transmission power range of the second transmitting terminal, a partition of an interference diagram of the first and second communications, into different areas, each area corresponding to a different type of processing of the interference;

calculating, for each of the first and second communications, respective minimum transmission power curves for performing the interference processing in each said area, in view of the first and second set flow rates;

determining, if any, a point of intersection of said minimum transmission power curves relating to the first and second communications;

deducing from coordinates of the point of intersection in the interference diagram, first and second transmission power values ($P^*_1, P^*_2$) to be allocated to the first and second transmitting terminals, respectively;

transmitting the first and second transmission power values to the first and second transmitting terminals, respectively.

2. The power allocating method according to claim 1, wherein said control node, further determines in which area of said partition said point of intersection is located, deduces therefrom first and second types of interference ($p^*,q^*$) for the first and second communications, and transmits said first and second types of interference to the first and second receiving terminals respectively.

3. The power allocating method according to claim 1 or 2, wherein, if the intersection of the minimum transmission power curves, relating to the first and second communications, is null, the control node informs the first and second transmitting terminals that a power allocation for said flow rate values is impossible.

4. The power allocating method according to claim 1 or 2, wherein said minimum transmission power curves of the first and second communications are defined by intervals and consist of portions of straight lines on the intervals, and wherein the control node determines an intersection between the minimum transmission power curves by searching for points of intersection between the straight lines relating to a first curve of said minimum transmission power curves and the straight lines relating to a second curve of said minimum transmission power curves, by removing from all of the points of intersection thus obtained, those that do not belong to corresponding segments, and selecting a point within all of the remaining points according to a predetermined criterion.

5. The power allocating method according to claim 4, wherein said criterion is the minimum transmission power for at least one of the first and second communications.

6. The power allocating method according to claim 4, wherein said criterion is the minimum sum of the transmission powers of the first and second communications.

7. The power allocating method according to claim 4, wherein said criterion is the minimum complexity of interference processings for at least one of the first and second communications.

8. The power allocating method according to claim 1 or 2, wherein each receiving terminal estimates respective channel coefficients between the first and second transmitting terminals and said each receiving terminal, and transmits the coefficients thus estimated to the control node.

9. The power allocating method according to claim 1 or 2, wherein each of the first and second transmitting terminals transmits to the control node the flow rate of the corresponding communication ($\rho_1, \rho_2$) as well as maximum powers ($P_1^{max}, P_2^{max}$) at which each of the first and second transmitting terminals can emit.

10. The power allocation method according to claim 1 or 2, wherein
the control node initially allocates the same transmission power ($P^{com}$) to the first and second transmitting terminals of said first and second couples, and
for the first communication, the control node determines in a first step which of respective ones of the second communication causes the highest interference level on the first communication, and
in a second step allocates power to the first and second transmitting terminals of said first and second communications by execution of said power allocation steps,
said first and second steps being repeated until a predetermined stop criterion is met.

11. The power allocation method according to claim 10, wherein the stop criterion is a maximum number of iterations.

12. The power allocation method according to claim 10, wherein the stop criterion is a convergence criterion for the consecutives powers allocated to the first and second transmitting terminals of the first and second couples.

13. The power allocation method according to claim 12, wherein if the convergence criterion is not fulfilled at the end of the predetermined number of iterations, the second communication between the terminals of the second couple is assigned transmission resources different from those used by the first communication between terminals of the first couple.

14. The power allocation method according to claim 1 or 2, wherein
said first and second couples are matched according to a predetermined matching criterion, for each pair consisting of the first and second couples, and
interference due to communications other than those of the first and second couples is taken into account as thermal noise.

15. The power allocation method according to claim 14, wherein said matching criterion is a degree of urgency, a priority order or a quality factor of a transmission channel.

16. The power allocation method according to claim 14, wherein transmission powers allocated to respective transmitting terminals of said couples of said plurality other than said first and second couples are set to a predetermined minimum value ($P^{min}$).

* * * * *